United States Patent
Riley et al.

(10) Patent No.: US 9,334,755 B2
(45) Date of Patent: May 10, 2016

(54) AIRFOIL WITH VARIABLE TRIP STRIP HEIGHT

(71) Applicant: United Technologies Corporation, Hartford, CT (US)

(72) Inventors: Sarah Riley, Glastonbury, CT (US); Mark A. Boeke, Plainville, CT (US); Jeffrey J. DeGray, Hampden, MA (US); Shawn J. Gregg, Wethersfield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 661 days.

(21) Appl. No.: 13/630,107

(22) Filed: Sep. 28, 2012

(65) Prior Publication Data

US 2014/0093361 A1    Apr. 3, 2014

(51) Int. Cl.
| | | |
|---|---|---|
| *F01D 5/18* | (2006.01) | |
| *F01D 25/12* | (2006.01) | |
| *F01D 9/02* | (2006.01) | |

(52) U.S. Cl.
CPC ............. *F01D 25/12* (2013.01); *F01D 5/187* (2013.01); *F01D 9/02* (2013.01); *F05D 2240/12* (2013.01); *F05D 2240/126* (2013.01); *F05D 2240/127* (2013.01); *F05D 2240/81* (2013.01); *F05D 2250/183* (2013.01); *F05D 2260/2212* (2013.01); *F05D 2260/22141* (2013.01); *Y02T 50/672* (2013.01); *Y02T 50/676* (2013.01)

(58) Field of Classification Search
CPC .......... F01D 5/187; F05D 2260/22141; F05D 2240/126
USPC ........................................................ 415/116
See application file for complete search history.

(56) References Cited

U.S. PATENT DOCUMENTS

| | | | |
|---|---|---|---|
| 5,695,321 A | | 12/1997 | Kercher |
| 6,068,445 A | * | 5/2000 | Beeck et al. ................. 416/96 R |
| 6,290,462 B1 | * | 9/2001 | Ishiguro et al. ............. 416/97 R |
| 6,343,474 B1 | * | 2/2002 | Beeck et al. .................... 60/752 |

(Continued)

FOREIGN PATENT DOCUMENTS

EP          2407639          1/2012

OTHER PUBLICATIONS

International Search Report and Written Opinion for PCT No. PCT/US2013/061857 mailed Jul. 10, 2014.

(Continued)

*Primary Examiner* — Ninh H Nguyen
*Assistant Examiner* — Jeffrey A Brownson
(74) *Attorney, Agent, or Firm* — Carlson, Gaskey & Olds, P.C.

(57) ABSTRACT

An airfoil component for a gas turbine engine includes an airfoil extending from a platform. At least one of the airfoil and the platform includes a cooling passage defined by a surface. A chevron-shaped trip strip extends from the surface into the cooling passage at a trip strip height along a length. The trip strip height varies along the length. A turbine vane for a gas turbine engine includes inner and outer platforms. A cooling passage is provided in the inner platform. The cooling passage is provided by first and second radially extending legs spaced circumferentially apart from one another and joined to one another by a circumferential passage. A pair of airfoils extend radially from the same inner platform. A trip strip extends from the surface into the circumferential passage at a trip strip height along a length. The trip strip height varying along the length.

13 Claims, 4 Drawing Sheets

(56) References Cited

U.S. PATENT DOCUMENTS

| | | |
|---|---|---|
| 6,406,260 B1 | 6/2002 | Trindade et al. |
| 6,672,836 B2 | 1/2004 | Merry |
| 8,840,371 B2 * | 9/2014 | Simpson et al. ............ 416/97 R |
| 2006/0104810 A1 * | 5/2006 | Hagle et al. ................ 415/210.1 |
| 2010/0206512 A1 | 8/2010 | Dube et al. |
| 2011/0123310 A1 | 5/2011 | Beattie et al. |
| 2011/0223004 A1 | 9/2011 | Lacy et al. |
| 2011/0286857 A1 * | 11/2011 | Gleiner et al. ............. 416/97 R |

OTHER PUBLICATIONS

International Preliminary Report on Patentability for PCT No. PCT/US2013/061857 mailed Apr. 9, 2015.

* cited by examiner

AIRFOIL WITH VARIABLE TRIP STRIP HEIGHT

BACKGROUND

This disclosure relates to a gas turbine engine, and more particularly to turbine vane platform, airfoil, and turbine blade cooling arrangements that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine vane design, there is an emphasis on stress-resistant airfoil and platform designs, with reduced losses, increased lift and turning efficiency, and improved turbine performance and service life. The vane airfoils and platforms include cooling features provided by flat ceramic core structures arranged within the casting during manufacturing. The resultant platform cooling passages formed by the cores are intended to protect the vane platform from the hot combustion gases. Moreover, the cores have been contained in the portion of the platform aft of the airfoil such that the core does not pass beneath any significant portion of the airfoil's other cooling passages. To achieve desired platform cooling results, non-linear flow analyses and complex strain modeling are required, making practical results difficult to predict. Vane loading and temperature considerations also impose substantial design limitations, which cannot easily be generalized from one system to another.

SUMMARY

In one exemplary embodiment, an airfoil component for a gas turbine engine includes an airfoil extending from a platform. At least one of the airfoil and the platform includes a cooling passage defined by a surface. A chevron-shaped trip strip extends from the surface into the cooling passage at a trip strip height along a length. The trip strip height varies along the length.

In a further embodiment of any of the above, the length is provided by multiple zones. The height varies between the zones.

In a further embodiment of any of the above, the multiple zones include first, second and third cooling passage heights. The trip strip includes first, second and third trip strip heights respectively within the first, second and third zones.

In a further embodiment of any of the above, the chevrons are provided by first and second legs joined to one another at an apex to provide the chevron-shape.

In a further embodiment of any of the above, a trip strip portion within each of the multiple zone includes a p/e ratio, wherein p corresponds to a pitch that provides a spacing between adjacent trip strips, and e corresponds to the trip strip height. The trip strip portions have a p/e ratio in the range of 3-20.

In a further embodiment of any of the above, the p/e ratio range is 3.0-5.5.

In a further embodiment of any of the above, the trip strip includes an e/h ratio, wherein e corresponds to a trip strip height and h corresponds to the cooling passage height. The e/h ratio of the trip strip is in a range of 0.05-0.40.

In a further embodiment of any of the above, the e/h ratio range is 0.10-0.30.

In a further embodiment of any of the above, the first and third zones each include a constant trip strip height that are different than one another. The second zone includes a varying trip strip height.

In a further embodiment of any of the above, the airfoil component is a turbine vane having an inner and an outer platform.

In a further embodiment of any of the above, the cooling passage is provided in the inner platform of the turbine vane.

In a further embodiment of any of the above, the turbine vane includes a pair of airfoils extending radially from the same inner platform.

In a further embodiment of any of the above, the cooling passage is provided by first and second radially extending legs spaced circumferentially apart from one another and joined to one another by a circumferential passage. The circumferential passage includes the trip strip.

In another exemplary embodiment, a turbine vane for a gas turbine engine includes inner and outer platforms. A cooling passage is provided in the inner platform. The cooling passage is provided by first and second radially extending legs spaced circumferentially apart from one another and joined to one another by a circumferential passage. A pair of airfoils extend radially from the same inner platform. A trip strip extends from the surface into the circumferential passage at a trip strip height along a length. The trip strip height varying along the length.

In a further embodiment of any of the above, the trip strip is chevron-shaped.

BRIEF DESCRIPTION OF THE DRAWINGS

The disclosure can be further understood by reference to the following detailed description when considered in connection with the accompanying drawings wherein.

DETAILED DESCRIPTION

Figure 1:
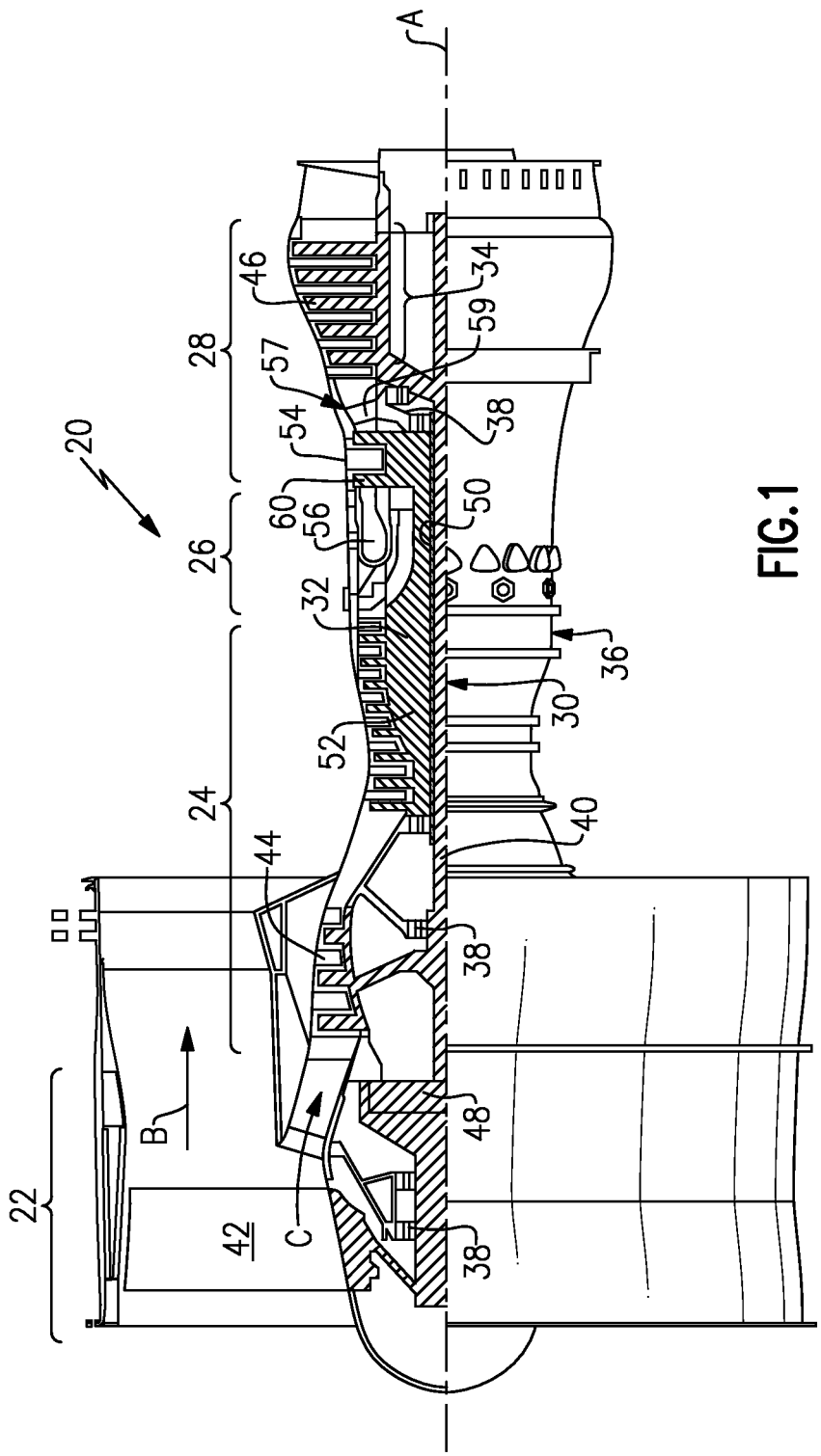
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown)

among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or second) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or first) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } °R)/(518.7°R)]^{0.5}$. The "Low corrected fan tip speed", as disclosed herein according to one non-limiting embodiment, is less than about 1150 ft/second.

Figure 2:
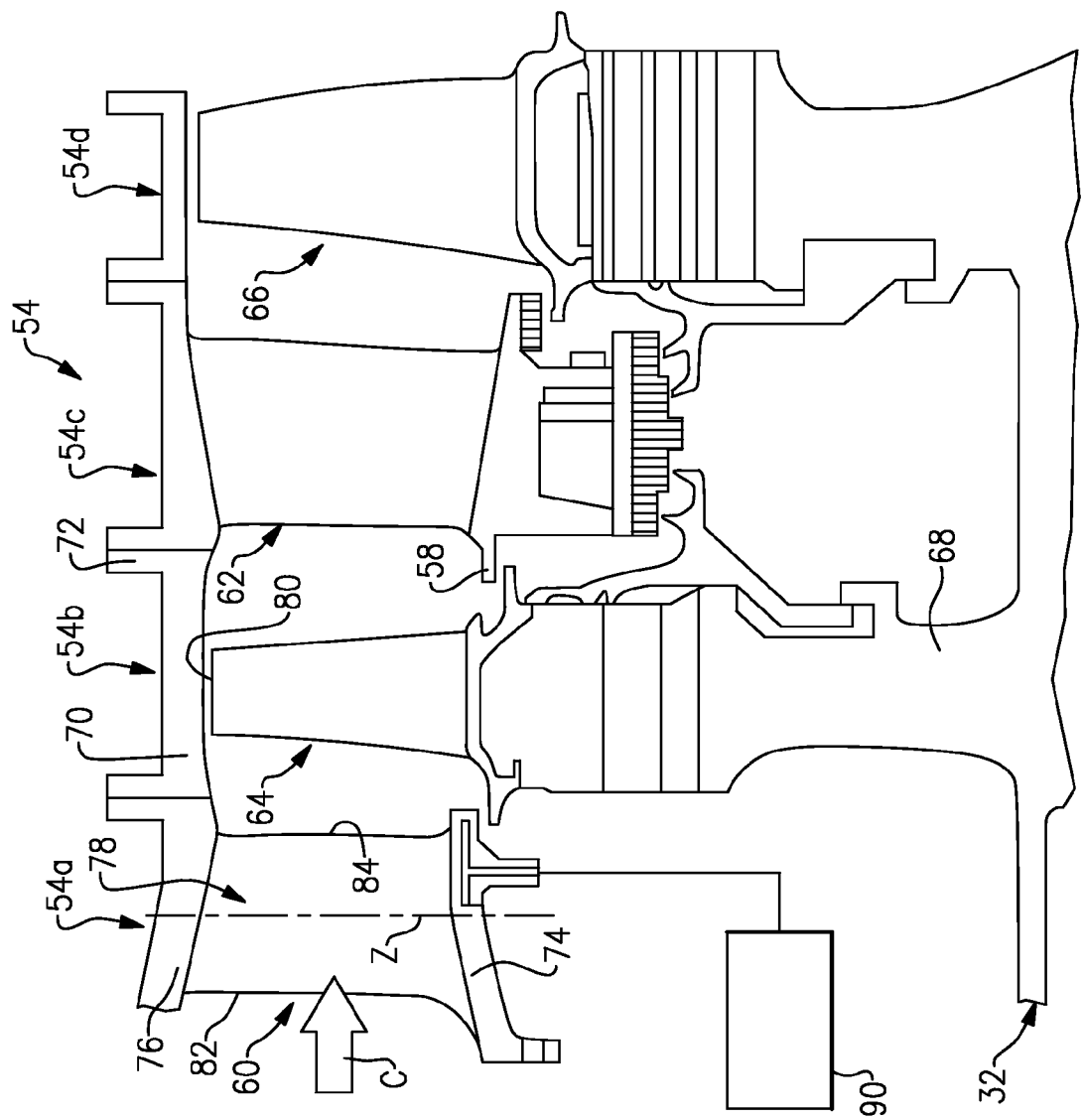
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62.

The turbine blades each include a tip 80 adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

Figure 3:
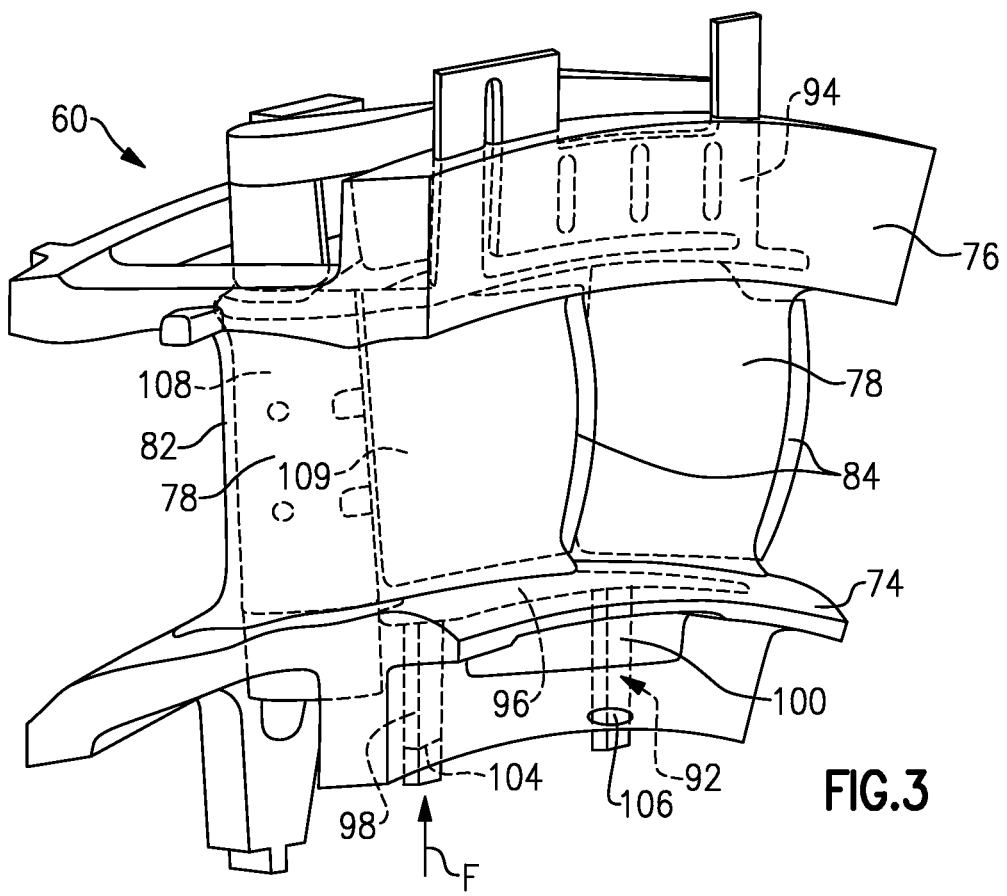
FIG. 3 is a perspective view of a turbine vane for the high pressure turbine section shown in FIG. 2.

Each vane 60, 62 or turbine vane includes an inner platform 74 and an outer platform 76 respectively defining inner and outer flow paths. The platforms 74, 76 are interconnected by an airfoil 78 extending in a radial direction Z. It should be understood that the turbine vanes may be discrete from one another or arranged in integrated clusters. For example, a "doublet" vane cluster is illustrated in FIG. 3. With continuing reference to FIG. 2, the airfoil 78 provides leading and trailing edges 82, 84. Cooling passages within the turbine vane 60, 62 are provided cooling fluid from a cooling source 90, such as compressor bleed air that can be fed from the outer or inner diameter direction.

The turbine vanes 60, 62 are constructed from a high strength, heat resistant material such as a nickel-based or cobalt-based superalloy, or of a high temperature, stress resistant ceramic or composite material. In cooled configurations, internal fluid passages and external cooling apertures can provide for a combination of impingement and film cooling. Other internal cooling approaches may be used such as trip strips, pedestals or other convective cooling techniques. In addition, one or more thermal barrier coatings, abrasion-resistant coatings or other protective coatings may be applied to the turbine vane 60, 62.

Referring to FIG. 3, the turbine vane 60, 62 is of a "doublet" type having two airfoils 78. The airfoils 78 extend between inner and outer platform 74, 76. Cooling passageways 92, 94 are respectively provided in the inner and outer platforms 74, 76. The passageways are indicated by dashed lines. Similarly, the airfoil 78 includes airfoil cooling passages 108, 109. Fluid from a cooling source 90, which can be fed from the outer or inner diameter (shown in FIG. 2), provides cooling fluid to the cooling passages 92, 94, 108, 109.

Figure 4:
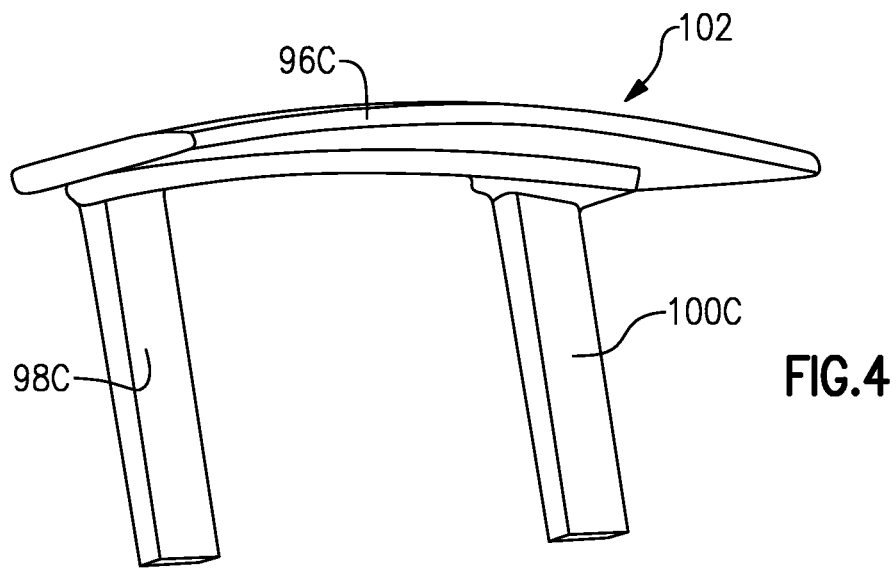
FIG. 4 is a perspective view of a core structure used to provide a cooling passage in an inner platform of the turbine vane of FIG. 3.

Referring to FIGS. 3 and 4, the cooling passage 92 (FIG. 3) provides heat transfer capability by a circumferential platform core 102 (FIG. 4). The circumferential platform core 102 includes first and second radial portions 98C, 100C interconnected by a circumferential portion 96C that is arranged within the inner platform 74. In one example, the core 102 is provided by a ceramic material or a refractory metal material, or a hybrid of a ceramic material and a refractory metal material, for example. However, it should be understood that other materials may be used to provide the core.

The first radial portion 98C extends from the inner platform 74 to provide an inlet 104 which receives a cooling flow F. A plug weld 106 is provided where the second radial portion 100C would exit the inner platform 74. As a result, the cooling flow F entering the circumferential portion 96 and first and second radial portion 98, 100 is forced to exit cooling holes (not shown) arranged on the inner platform 94 at the inner core flow surface adjoining the aft portion airfoil 78.

Figure 5:
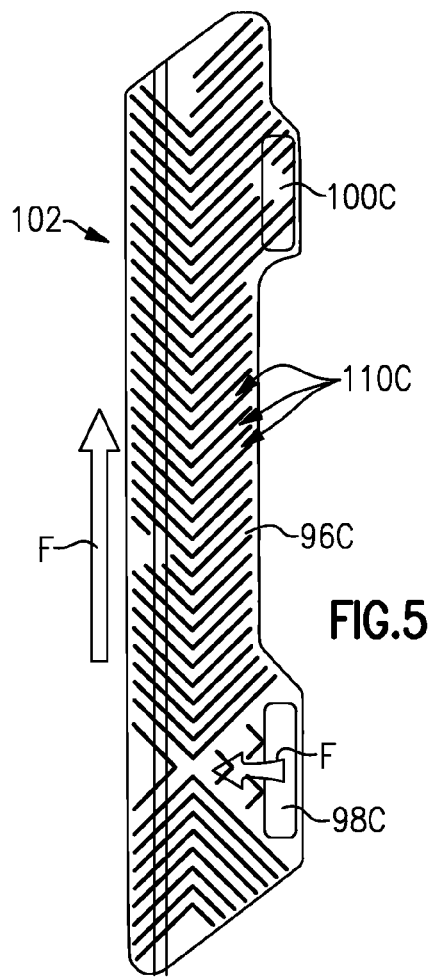
FIG. 5 is a plan view of the core structure of FIG. 4.
Figure 6:
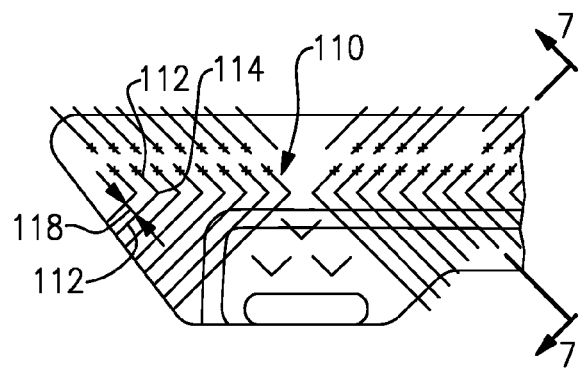
FIG. 6 is a plan view of a portion the cooling passage of FIG. 4.
Figure 7:
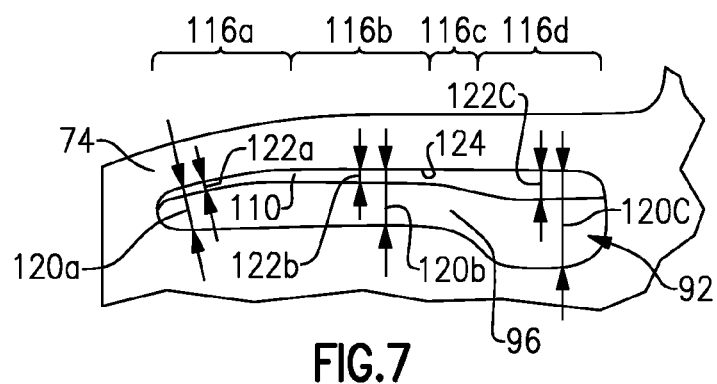
FIG. 7 is a cross-sectional view through the cooling passage taken along line 7-7 of FIG. 6.

The gas path surface of the inner platform core 102 is illustrated in FIG. 5. The circumferential portion 96C includes multiple spaced apart trip strip grooves 110C that provide correspondingly shaped trip strips 110 in the cast inner platform 74, as illustrated in FIG. 7. In one example, the trip strips 110 are arranged in a chevron-shaped pattern, shown in FIG. 6. The trip strips 110 include legs 112 joining one another at the apex to provide a generally right angle-shaped cooling feature, which generates turbulence within the cooling passage 92 that increases heat transfer. In the example, the trip strips 110 are spaced apart a pitch 118 from one another, and in the example, evenly spaced from one another.

Referring to FIG. 7, the cross-sectional thickness of the first cooling passage 92 of the circumferential portion 96 varies along its axial length. The trip strips 110 extend from a surface 124 within the cooling passage 92. Typically, a trip strip would have a uniform height throughout a varying core or cooling passage thickness. In the example illustrated in FIG. 7, the trip strip height 122 varies in the multiple zones 116A, 116B, 116C, 116D as the core height 120A, 120B, 120C varies within the zones. The trip strips height 122A, 122B, 122C is generally constant in the zones 116A, 116B, 116D. The trip strip height for a given trip strip varies within the zone 116C. The varying trip strip height generally changes with the varying cooling passage height. Of course, there may be a different number of zones than depicted and which may be configured differently depending on a core geometry.

The geometry and configuration of the trip strips within the various zones may be characterized by reference to a p/e ratio and e/h ratio, where p corresponds to pitch, e corresponds to trip strip height, and h corresponds to cooling passage height. Cooling passage heights vary and trip strip or cooling augment features are adjusted for the given passage.

The p/e ratio for the multiple zones is in the range of 3-20, and the e/h ratio is in a range of 0.05-0.40. In one example, the p/e ratio for the multiple zones is in the range of 3.0-5.5, and the e/h ratio is in a range of 0.10-0.30. For zone 116A, the example p/e ratio is 3.3 and the e/h ratio is 0.15; zone 116B has a p/e of 3.3 and e/h of 0.25; zone 116C has a p/e of 5.0 and e/h of 0.17; and zone 116D has a p/e of 5.0 and e/h of 0.23.

Trip strip height variation in relation to core passage height allows for increased heat transfer and cooling capability. This feature may be used in airfoil and/or platform core passages for vanes and/or blades.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil component for a gas turbine engine comprising:
   an airfoil extending from a platform, the platform including a cooling passage defined by a surface, wherein the airfoil component is a turbine vane having an inner and an outer platform, wherein the turbine vane includes a pair of airfoils extending radially from the same inner platform, wherein the cooling passage is provided in the inner platform of the turbine vane, wherein the cooling passage is provided by first and second radially extending legs spaced circumferentially apart from one another and joined to one another by a circumferential passage, the first radially extending leg provides an inlet to the cooling passage, and the second radially extending leg is plugged; and
   chevron-shaped trip strips extending from the surface into the cooling passage at a trip strip height along a length, the trip strip height varying along the length, the circumferential passage including the trip strips, the trip strips arranged on either of opposing sides of the first radially extending leg with the chevron-shape on each of the opposing sides facing opposing directions.

2. The airfoil component according to claim 1, wherein the length is provided by multiple zones, the height varying between the zones.

3. The airfoil component according to claim 2, wherein the multiple zones include first, second and third cooling passage heights, and the trip strip includes first, second and third trip strip heights respectively within the first, second and third zones.

4. The airfoil component according to claim 1, wherein the chevrons are provided by first and second legs joined to one another at an apex to provide the chevron-shaped trip strips.

5. The airfoil component according to claim 3, wherein a trip strip portion within each of the multiple zone includes a p/e ratio, wherein p corresponds to a pitch that provides a spacing between adjacent trip strips, and e corresponds to the trip strip height, the trip strip portions having p/e ratio in the range of 3-20.

6. The airfoil component according to claim 5, wherein the p/e ratio range is 3.0-5.5.

7. The airfoil component according to claim 3, wherein the trip strip includes an e/h ratio, wherein e corresponds to a trip strip height and h corresponds to the cooling passage height, the e/h ratio of the trip strip in a range of 0.05-0.40.

8. The airfoil component according to claim 7, wherein the e/h ratio range is 0.10-0.30.

9. The airfoil component according to claim 3, wherein the first and third zones each include a constant trip strip height that are different than one another, and the second zone includes a varying trip strip height.

10. A turbine vane for a gas turbine engine comprising:
inner and outer platforms, and a cooling passage is provided in the inner platform, wherein the cooling passage is provided by first and second radially extending legs spaced circumferentially apart from one another and joined to one another by a circumferential passage, wherein the second leg is plugged to obstruct airflow therethrough;
a pair of airfoils extending radially from the same inner platform; and
a trip strip extending from a surface of the circumferential passage into the circumferential passage at a trip strip height along a length, the trip strip height varying along the length.

11. The turbine vane according to claim 10, wherein the trip strip is chevron-shaped.

12. The airfoil component according to claim 1, wherein the trip strip height varies along its length with a height of the cooling passage.

13. The airfoil component according to claim 12, wherein the trip strip height increases along its length as the height of the cooling passage increases.

* * * * *